(12) United States Patent
Stieger et al.

(10) Patent No.: US 11,566,562 B2
(45) Date of Patent: *Jan. 31, 2023

(54) GAS TURBINE ENGINE

(71) Applicants: ROLLS-ROYCE plc, London (GB); ROLLS-ROYCE CORPORATION, Indianapolis, IN (US)

(72) Inventors: Rory D. Stieger, Derby (GB); Daniel Swain, Fishers, IN (US)

(73) Assignees: ROLLS-ROYCE PLC, London (GB); ROLLS-ROYCE CORPORATION, Indiana, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,736

(22) Filed: Apr. 19, 2022

(65) Prior Publication Data

US 2022/0235698 A1 Jul. 28, 2022

Related U.S. Application Data (63) Continuation of application No. 17/061,057, filed on Oct. 1, 2020, now Pat. No. 11,339,714.

(60) Provisional application No. 62/924,755, filed on Oct. 23, 2019.

(51) Int. Cl.
*F02C 3/08* (2006.01)
*F02C 7/18* (2006.01)

(52) U.S. Cl.
CPC .............. *F02C 3/08* (2013.01); *F02C 7/18* (2013.01); *F05D 2220/32* (2013.01)

(58) Field of Classification Search
CPC .................. F03C 3/08; F02C 7/18; F02C 3/08
See application file for complete search history.

(56) References Cited

U.S. PATENT DOCUMENTS

| 4,968,216 A | 11/1990 | Anderson et al. |
| 7,254,951 B2* | 8/2007 | Lockwood, Jr. ........ F02C 6/003 |
| | | 60/774 |
| 7,255,531 B2 | 8/2007 | Ingistov |
| 9,366,260 B2 | 6/2016 | Bradbrook et al. |
| 11,339,714 B2* | 5/2022 | Stieger ...................... F02C 3/08 |

(Continued)

FOREIGN PATENT DOCUMENTS

| FR | 1 246 033 A | 11/1960 |
| WO | 00/39441 A1 | 7/2000 |

OTHER PUBLICATIONS

Mar. 16, 2021 Extended Search Report issued in European Patent Application No. 20201450.2.

(Continued)

*Primary Examiner* — Michael L Sehn
(74) *Attorney, Agent, or Firm* — Oliff PLC (57) ABSTRACT

A gas turbine engine comprises, in fluid flow series, a gas-generator compressor, a combustor, a gas-generator turbine, and a free power turbine. The gas-generator compressor is an axi-centrifugal compressor comprising a plurality of axial compression stages followed by a single centrifugal compression stage, wherein the International Standard Atmosphere, sea-level static (hereinafter ISA SLS) design point pressure ratio of the axi-centrifugal compressor is from 12 to 16, and a ratio of the ISA SLS pressure rise across the axial compression stages to the ISA SLS pressure rise across the centrifugal compression stage is from 0.75 to 1.

10 Claims, 6 Drawing Sheets

(56) References Cited

U.S. PATENT DOCUMENTS

2016/0348591 A1    12/2016  Suciu et al.
2017/0204787 A1     7/2017  Duesler et al.
2018/0106193 A1     4/2018  D'Angelo et al.
2019/0017382 A1     1/2019  Clements et al.

OTHER PUBLICATIONS

Dec. 8, 2021 Office Action issued in U.S. Appl. No. 17/061,057.
Feb. 1, 2022 Notice of Allowance issued in U.S. Appl. No. 17/061,057.

* cited by examiner

GAS TURBINE ENGINE

This is a Continuation of application Ser. No. 17/061,057 filed Oct. 1, 2020, which in turn claims benefit of Provisional Application No. 62/924,755 filed Oct. 23, 2019. The entire disclosures of the prior applications are hereby incorporated by reference herein in their entireties.

TECHNICAL FIELD

This disclosure relates to gas turbine engines, in particular gas turbine engines with a single-spool gas-generator and a free power turbine.

BACKGROUND

Turboshaft-configuration gas turbines are known, and find particular application as auxiliary power units (APUs) in airliners. Most engines in such an application are single-spool turboshaft engines, which comprise a turbine which drives a compressor and the load. Most turboshaft engines are designed to drive loads which require a fixed synchronous speed (such as in electrical power generation) or operate according to a cube-law (such as ship propellers).

Such operational constraints on the engine often result in sub-optimal designs, as part load compressor surge margin is eroded due to the fixed output speed. This is because as the compressor is forced to operate at a constant non-dimensional speed ($N/\sqrt{T}$) despite a reduction in corrected flow ($W\sqrt{T}/P$). This leads to compromises in the aerodynamic design of the compressor, and consequently increases fuel consumption and emissions.

SUMMARY

The invention therefore provides a turboshaft gas turbine engine comprising, in fluid flow series, a gas-generator compressor, a combustor, a gas-generator turbine, and a free power turbine.

wherein the gas-generator compressor is an axi-centrifugal compressor comprising a plurality of axial compression stages followed by a single centrifugal compression stage, wherein the International Standard Atmosphere, sea-level static (hereinafter ISA SLS) design point pressure ratio of the axi-centrifugal compressor is from 12 to 16, and a ratio of the ISA SLS pressure rise across the axial compression stages to the ISA SLS pressure rise across the centrifugal compression stage is from 0.75 to 1.

This provides a highly efficient gas-generator section of the engine, reducing fuel consumption and emissions.

In an embodiment, the axi-centrifugal compressor comprises from 3 to 5 axial compression stages.

In an embodiment, the axi-centrifugal compressor comprises 4 axial compression stages.

In an embodiment, the engine further comprises a fixed-geometry inlet guide vane for the compressor.

In an embodiment, the gas-generator turbine is a single stage turbine.

In an embodiment, the gas-generator turbine comprises an uncooled rotor.

In an embodiment, the gas-generator turbine comprises a supersonic throughflow stator and a subsonic throughflow rotor.

In an embodiment, the gas-generator turbine comprises a cooled rotor cooled by air bled from the gas-generator compressor.

In an embodiment, the gas-generator turbine comprises a supersonic throughflow stator and a supersonic throughflow rotor.

In an embodiment, the engine has a core size, defined as the ISA SLS design point non-dimensional flow function in which the mass flow W is measured at the entry to the compressor (station 2) and the temperature T and the pressure P are measured at the exit of the compressor (station 3) such that the core size is equal to $W2\sqrt{T3}/P3$.

In an embodiment, the core size is from 0.5 to 1.5.
In an embodiment, the core size is from 0.7 to 0.9.
In an embodiment, the core size is from 1.0 to 1.5.
In an embodiment, the free power turbine is one of a single-stage turbine, and a two-stage turbine.

In an embodiment, the gas-generator turbine and the free power turbine are arranged to contra-rotate.

BRIEF DESCRIPTION OF THE DRAWINGS

Embodiments will now be described by way of example only with reference to the accompanying drawings, which are purely schematic and not to scale, and in which.

DETAILED DESCRIPTION

In the Figures, station numbering according to ARP 755A is used.

Figure 1:
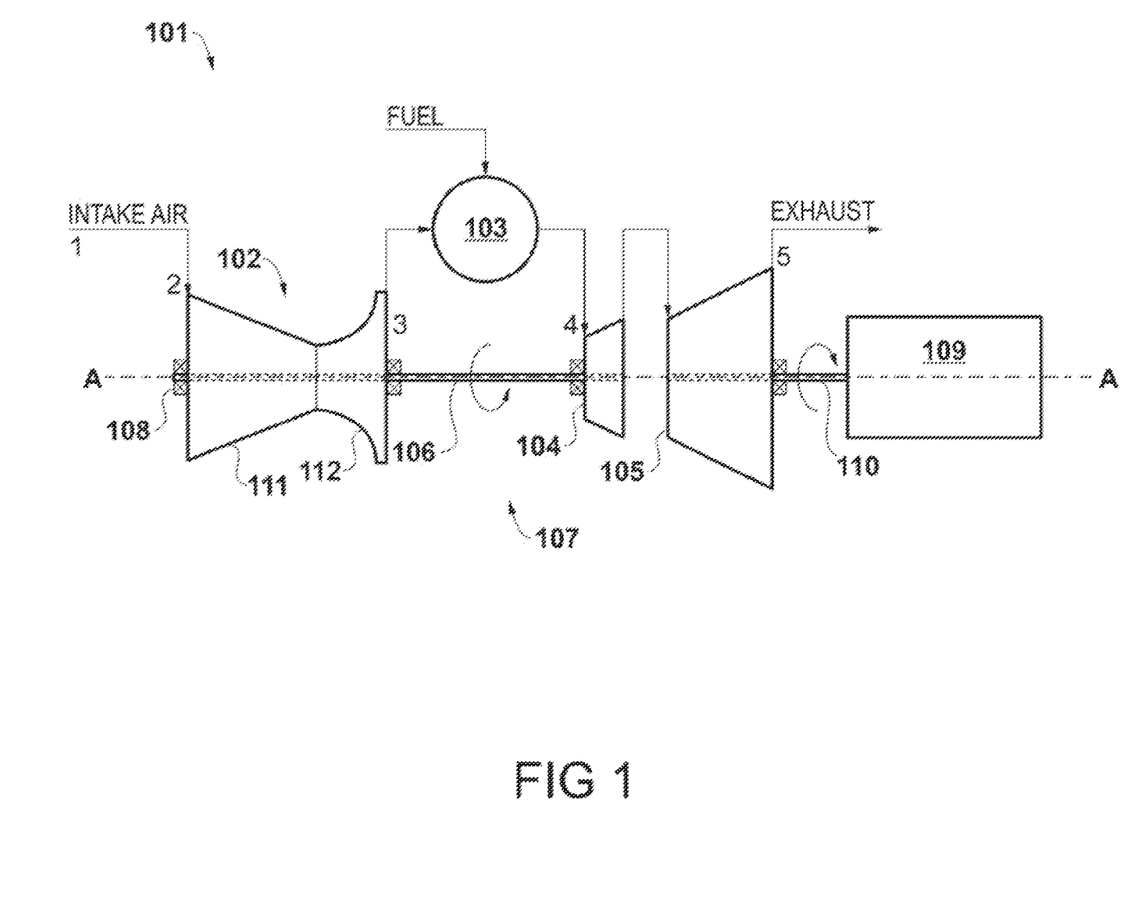
FIG. 1 is a block diagram illustrating an embodiment of a turboshaft gas turbine engine.

A block diagram illustrating a first embodiment of a turboshaft gas turbine engine is shown in FIG. 1.

The engine, identified generally by numeral 101, comprises in fluid flow series a gas-generator compressor 102, a combustor 103, a gas-generator turbine 104, and a free power turbine 105.

It will be appreciated that as the engine of a single-spool, free power turbine configuration, there is no turbomachinery upstream of the gas-generator compressor 102. The gas-generator compressor 102 and the gas-generator turbine 104 are mechanically linked so as to rotate in unison around an engine centreline A-A by an interconnecting shaft 106, and together form a gas-generator spool 107. Bearings 108 support the gas-generator spool 107 relative to static structures of the engine 101. The free power turbine 105 is mechanically linked with a load 109 via an output shaft 110.

In operation, intake air is received at station 1 and enters the gas-generator compressor 102 at station 2. The air is compressed by the gas-generator compressor 102, and exits therefrom at station 3 where it is supplied to the combustor 103, mixed with fuel and ignited. The hot combustion products leave the combustor 103 at station 4 and are expanded through the gas-generator turbine 104, causing it to rotate and drive the compressor 102. At this point the flow exiting the gas-generator turbine 104 still comprises a significant amount of enthalpy, which develops work in the free power turbine 105, thereby driving the load 109.

In this embodiment, the gas-generator turbine 104 rotor is uncooled, and thus receives no flow of cooling air from the gas-generator compressor 102. In this embodiment therefore the gas-generator turbine 104 is comprised of a material with sufficient thermal capability such that it does not require cooling. In an embodiment, said material is a ceramic. In a specific embodiment, the ceramic is composite ceramic material such as a ceramic matrix composite (CMC). One suitable type of CMC is a silicon carbide/silicon carbide CMC, although other CMC types may be specified. In another specific embodiment, the ceramic is a monolithic ceramic. For example, the monolithic ceramic may be silicon nitride. In an embodiment, the gas-generator turbine 104 is a high-work single stage low reaction turbine, which will be described further with reference to FIG. 3.

In the present implementation, the gas-generator compressor 102 is an axi-centrifugal compressor, and thus includes an initial set of axial compression stages 111, followed by a centrifugal compression stage 112. The gas-generator compressor 102 will be described in further detail with reference to FIG. 6.

In this embodiment, the design point pressure ratio of the compressor 102 is from 12 to 16. In this specific embodiment, the design point pressure ratio of the compressor 102 is 12. As used herein, the term "design point" for the engine 101 is the maximum rated power operating condition at International Standard Atmosphere (ISA) sea level static (SLS) conditions—the definition of which will be immediately apparent to those skilled in the art, as will the corrections which may be carried out to convert from any given day condition to these standard conditions.

In the present embodiment, the axial compression stages 111 together provide a pressure rise of from 0.75 to 1 times the pressure rise of the centrifugal compression stage 112. This provides an extremely efficient compression system.

In the present embodiment, the free power turbine 105 is configured to rotate around the engine centreline A-A. It will be appreciated that in alternative embodiments the free power turbine 105 may be located on an axis different from the engine centreline A-A.

In the present embodiment, the free power turbine 105 is configured to rotate in the opposite direction to the gas-generator turbine 104, i.e. they are arranged to contra-rotate. As will be described further with reference to FIG. 3 onward, this may reduce the amount of flow turning required between the turbine stages. However, in alternative embodiments the free power turbine 105 may instead be configured to co-rotate with the gas-generator turbine 104.

In the present embodiment, the load 109 is a variable-speed load. For example, the load may be a load compressor for supplying compressed air, or the load may be a variable-frequency electrical generator, or any other variable-speed load or combinations thereof. It is contemplated that the engine 101 may be particularly well suited as an auxiliary power unit for an aircraft, in which it is tasked with providing compressed air for the cabin and electrical power for services on the aircraft.

In the configuration shown in FIG. 1, the gas-generator spool 107 and the combination of the free power turbine 105 and the load 109 are both able to vary in speed. In this way, fuel consumption and emissions may be reduced.

Figure 2:
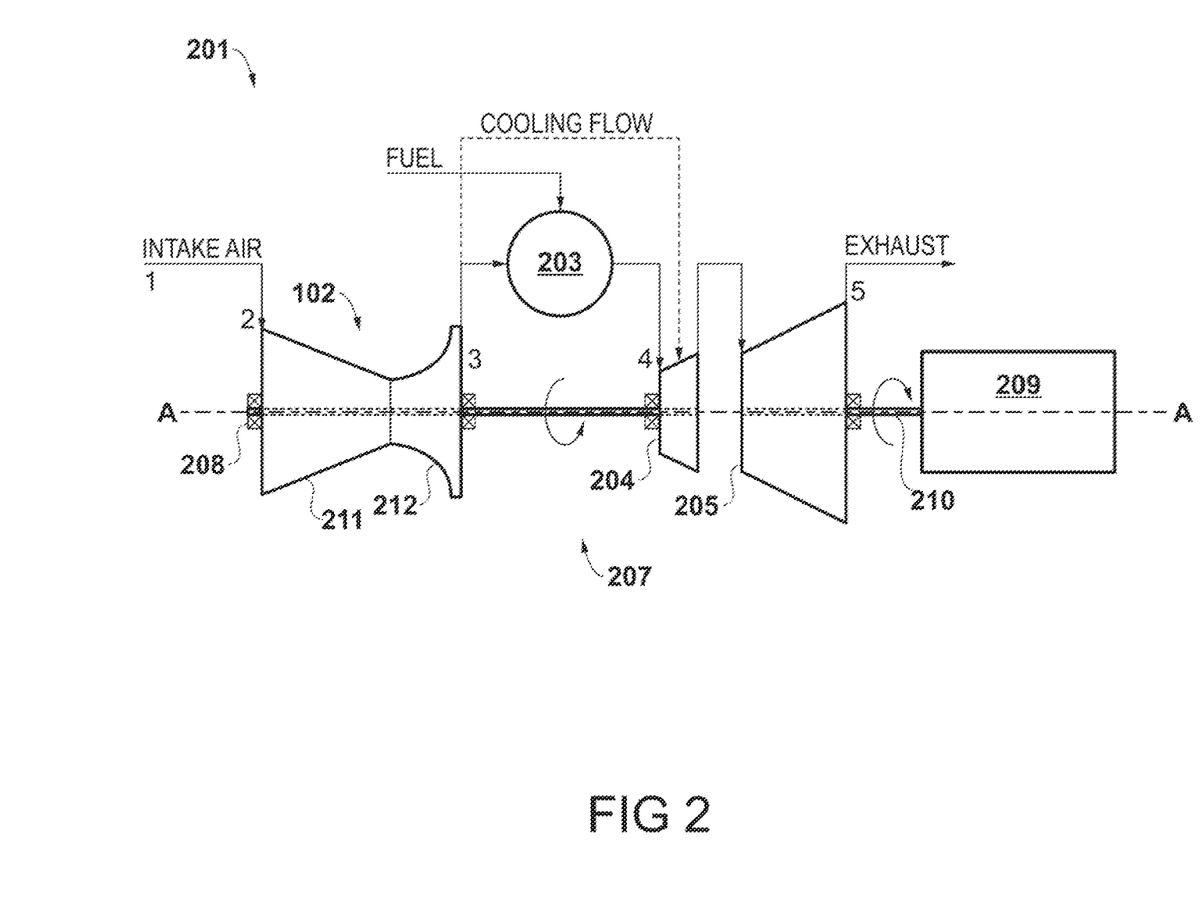
FIG. 2 is a block diagram illustrating another embodiment of a turboshaft gas turbine engine

A block diagram illustrating a second embodiment of a turboshaft gas turbine engine is shown in FIG. 2. This engine, identified by numeral 201, shares much the same configuration as the engine 101 of FIG. 1, and so like features are identified with the same numerals incremented by 100.

In this example, though, the gas-generator turbine 204 comprises a cooled rotor. Thus, air compressed by the gas-generator compressor 202 is supplied to the gas-generator turbine 204 to remove heat therefrom. In this way, the thermal capability of the turbine blades may be relaxed in comparison to those in the gas-generator turbine 104. Thus, in an example the blades gas-generator turbine 204 may be comprised of an alloy, for example a superalloy. One such superalloy may be a nickel-base superalloy, such as an Inconel® alloy. Other superalloy types could also be used, for example a cobalt-base alloy, or combinations thereof such as Mar M® alloys.

In an embodiment, the gas-generator turbine 204 is a high-work single stage supersonic turbine, which will be described further with reference to FIG. 4.

Again, in this embodiment, the ISA SLS design point pressure ratio of the compressor 202 may be from 12 to 16. As will be appreciated, the requirement to supply cooling air to the gas-generator turbine 204 means that a degree of work expended by the compressor 202 effectively escapes the gas-generator thermodynamic cycle, and does not contribute to work delivered by the gas-generator turbine 204. In a specific embodiment, therefore, the ISA SLS design point pressure ratio of the compressor 202 is 16.

Figure 3:
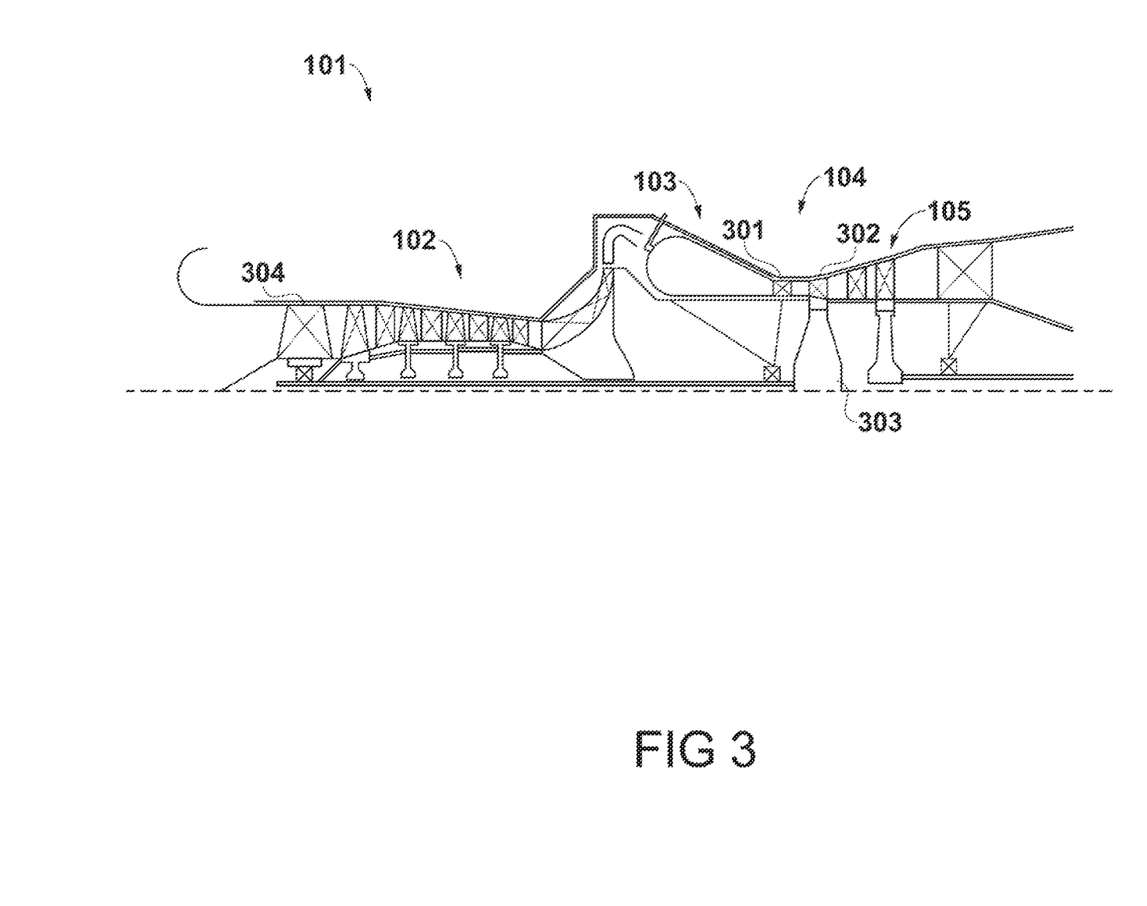
FIG. 3 is a general arrangement of the engine of FIG. 1 with a single stage free power turbine.

A general arrangement of the engine 101 is shown in FIG. 3.

As described previously, in this embodiment the gas-generator 104 is a high-work single stage low reaction turbine. The gas-generator turbine 104 comprises a stator having a plurality of nozzle guide vanes 301, followed by a rotor having a plurality of blades 302 mounted on a disc 303. As can be seen in the Figure, the adoption of a free power turbine 205 allows the disc 303 to be made solid and thus thinner in an axial sense.

In this example, the gas-generator turbine rotor is uncooled, and so all flow delivered by gas generator compressor 102 is developed into shaft work by the turbine 104. Thus, as described previously, a more moderate ISA SLS design point pressure ratio for the compressor 102 may be adopted, for example 12, although it is contemplated that higher pressure ratios within the aforesaid range may be adopted.

Thus, in this embodiment, the gas-generator turbine 104 has a supersonic throughflow stator and a subsonic throughflow rotor. Thus, the degree of reaction of the stage is less than 0.5, which will be understood by those skilled in the art to reflect an equal enthalpy drop across the stator and the rotor in the stage. In a specific embodiment, the degree of reaction of the gas generator turbine 104 stage is from 0.15 to 0.4. This corresponds to a selection of specific work of from 200 to 290 kilojoules per kilogram. In a more specific embodiment, the degree of reaction of the stage is from 0.25 to 0.33. This corresponds to a selection of specific work of from 240 to 270 kilojoules per kilogram kilojoules per kilogram. In a more specific embodiment, the degree of reaction of the stage is 0.3. This corresponds to a selection of specific work of 260 kilojoules per kilogram. Selections within these ranges results in a highly efficient turbine stage which produces sufficient work to drive the compression system at a pressure ratio for satisfactory specific fuel consumption over a wide range of power settings.

In this particular example, the free power turbine 105 is a single stage free power turbine. Further, due to the high-work single stage design adopted for the gas-generator turbine 104, in the present embodiment the free power turbine 105 is arranged to contra-rotate relative to the gas-generator turbine 104. As will be appreciated by those skilled in the art, a high-work single stage design exhibits high tangential exit Mach numbers and thus a high degree of exit swirl. By arranging the free power turbine 105 in contra-rotation, it is possible to avoid having to provide a further inter-stage vane to provide flow-turning.

Finally, as shown in the Figure, in an embodiment the gas-generator compressor 102 may comprise an inlet guide vane 304. In a specific embodiment, the inlet guide vane 304 is a fixed inlet guide vane, i.e. its geometry is not variable. This reduces complexity and reduces weight, and is made possible by adoption of an axi-centrifugal compression arrangement which exhibits high surge margin and a wide operating range.

Figure 4:
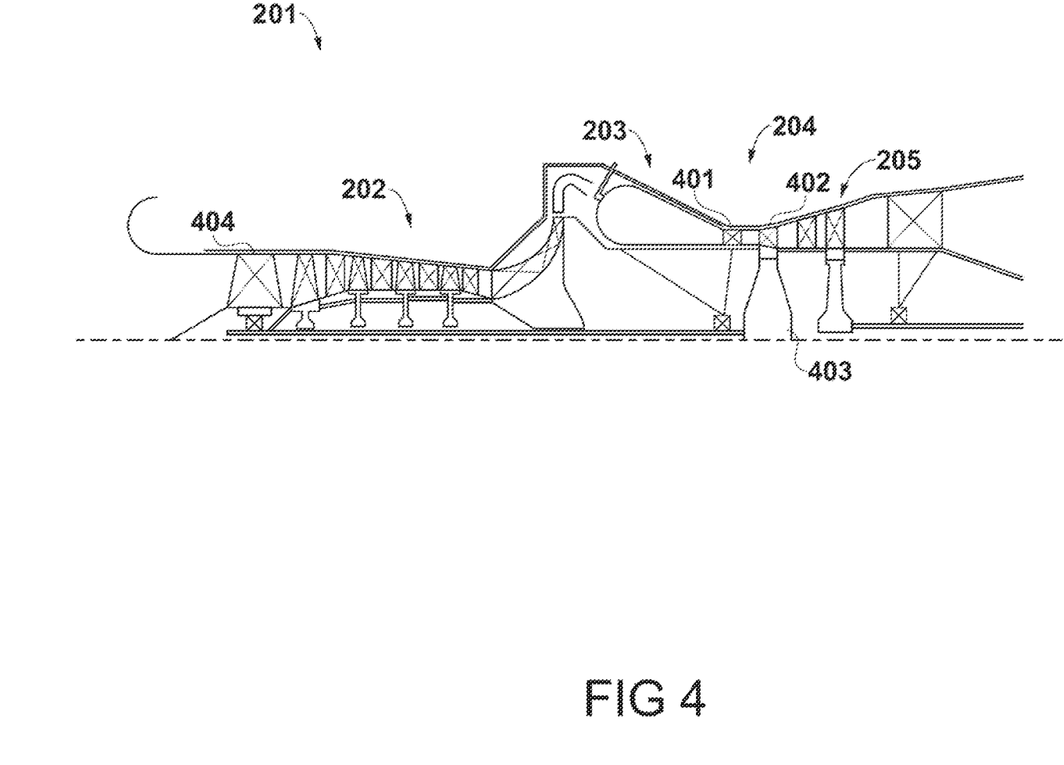
FIG. 4 is a general arrangement of the engine of FIG. 2 with a single stage free power turbine.

A general arrangement of the engine 201 is shown in FIG. 4. In this particular example, the free power turbine 205 is also a single stage free power turbine. As described previously, in this embodiment the gas-generator 204 is a high-work single stage turbine. The gas-generator turbine 204 comprises a stator having a plurality of nozzle guide vanes 401, followed by a rotor having a plurality of blades 402 mounted on a disc 403.

In this example, the gas-generator turbine rotor is uncooled, and so all flow delivered by gas-generator compressor 202 is developed into shaft work by the turbine 204. Thus, as described previously, a greater ISA SLS design point pressure ratio for the compressor 202 may be adopted, for example 16, although it is contemplated that higher pressure ratios within the aforesaid range may be adopted.

Thus, in this embodiment, the gas-generator turbine 204 has both a supersonic throughflow stator and a supersonic throughflow rotor. Thus, in this embodiment the degree of reaction of the stage is closer to 0.5, which will be understood by those skilled in the art to reflect an equal enthalpy drop across the stator and the rotor in the stage. In a specific embodiment, the degree of reaction of the gas generator turbine 204 stage is from 0.4 to 0.55. This corresponds to a selection of specific work of from 290 to 350 kilojoules per kilogram. In a more specific embodiment, the degree of reaction of the stage is from 0.43 to 0.51. This corresponds to a selection of specific work of from 305 to 330 kilojoules per kilogram. In a more specific embodiment, the degree of reaction of the stage is 0.47. This corresponds to a selection of specific work of 320 kilojoules per kilogram. This selection results in a single stage turbine arrangement which produces sufficient work to drive the compression system at the high pressure ratios defined above.

As with the engine 101, the adoption of a free power turbine 205 allows the disc 403 to be made solid and thus thinner in an axial sense.

As with the engine 101, in an embodiment the free power turbine 205 and the gas-generator turbine 204 are arranged to contra-rotate so as to accommodate the high levels of exit swirl from the gas-generator turbine 204.

Figure 5:
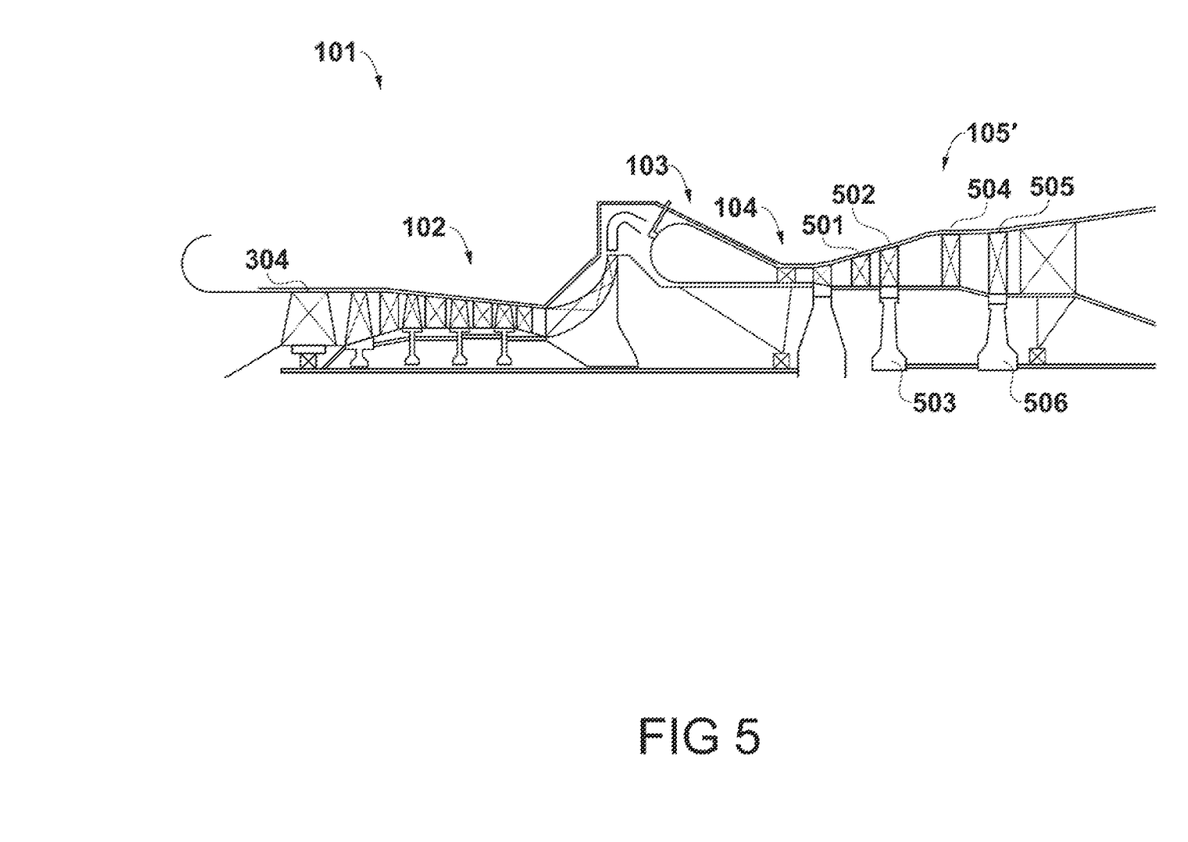
FIG. 5 is a general arrangement of the engine of FIG. 1 with a two stage free power turbine.

A further general arrangement of the engine 101 is illustrated in FIG. 5, although in this example the free power turbine is a two-stage free power turbine 105'. It therefore includes a first stage comprising a stator having nozzle guide vanes 501 and a rotor having blades 502 mounted on a disc 503. A second stage axially downstream of the first stage comprising a stator having nozzle guide vanes 504 and a rotor having blades 505 mounted on a disc 506.

It will be appreciated by those skilled in the art that the use of a two-stage free power turbine allows either a higher shaft power output by way of an increase in enthalpy drop across the turbine, or alternatively the use of a lower stage loading and thus an improvement in expansion efficiency for the same work output. The use of a two-stage turbine like the free power turbine 105 is also envisaged as being possible with the engine 201.

Figure 6:
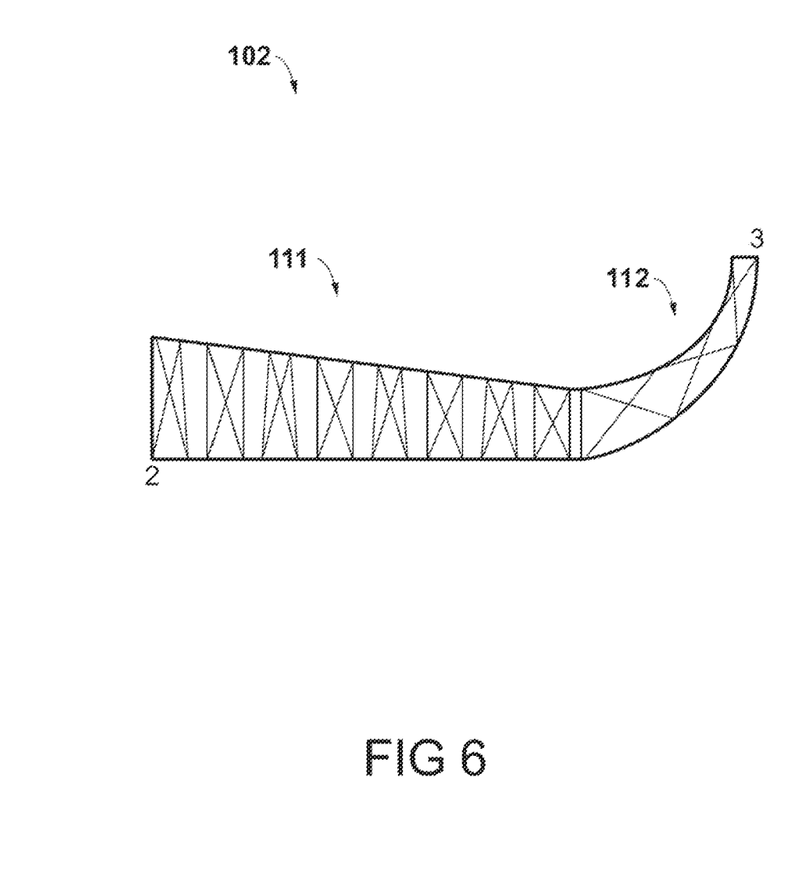
FIG. 6 shows the gas-generator compressor of the engine of FIG. 1.

The gas path axi-centrifugal gas-generator compressor 102 is shown in FIG. 6, the inlet to which is defined as station 2 and the outlet of which is defined as station 3. The gas-generator 202 for the engine 201 may adopt the same configuration, or may have a higher ISA SLS design point pressure ratio.

As described previously, the axi-centrifugal gas-generator compressor 102 comprises a set of axial compression stages 111 followed by a centrifugal compression stage 112. In an embodiment, the overall ISA SLS design point pressure ratio of the whole compressor is from 12 to 16. The ratio of the pressure rise in the axial compression stages 111 to the pressure rise in the centrifugal compression stage 112 is from 0.75 to 1.

Thus, in the present embodiment, with an ISA SLS design point pressure ratio of 12, the axial compression stages 111 may provide a pressure rise of from 2.6 to 3.5. This provides a highly efficient centrifugal compression stage as its pressure ratio lies in the range from 3.5 to 4.6.

In an embodiment, the number of axial compression stages is from 3 to 5. This provides a highly efficient set of axial compression stages 111 as the pressure rise per stage corresponds to optimal stage loading. In the present embodiment, there are 4 axial compression stages, which provides an optimal balance between loading, and therefore compression efficiency, and length and weight, and therefore power-to-weight ratio.

Engines according to the invention have a core size, defined as the ISA SLS design point non-dimensional flow function in which the mass flow W is measured at the entry to the compressor (station 2) and the temperature T and the pressure P are measured at the exit of the compressor (station 3) such that the core size is equal to $W_2\sqrt{T_3}/P_3$. Measured in this way, any loss of mass flow due to use for sealing or other bleed is accounted for. In an embodiment, the engine 101 is sized such that the core size is from 0.5 to 1.5. This provides a highly efficient engine. In a specific embodiment, the core size is from 0.7 to 0.9 This core size in the engines according to the present invention corresponds to a shaft power output of from about 300 kilowatts to 600 kilowatts. In another specific embodiment, the core size is from 1.0 to 1.5. This core size in the engines according to the present invention corresponds to a shaft power output of from about 600 kilowatts to 1400 kilowatts. Compared to prior art engines however these are very low core sizes for the power output, which is indicative of the reduced specific fuel consumption and increased power-to-weight ratio.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A gas turbine engine comprising, in fluid flow series:
   a gas-generator compressor;
   a combustor,
   a single stage gas-generator turbine, which comprises an uncooled, subsonic throughflow rotor and a supersonic throughflow stator; and
   a free power turbine,
   wherein the gas-generator turbine has a specific work of from 200 to 350 kilojoules per kilogram, the specific work being the power output of the gas-generator turbine per unit mass flow therethrough, the gas-generator compressor is an axi-centrifugal compressor comprising a plurality of axial compression stages followed by a single centrifugal compression stage, an International Standard Atmosphere, sea-level static (hereinafter ISA SLS) design point pressure ratio of the axi-centrifugal compressor is from 12 to 16, and a ratio of ISA SLS pressure rise across the axial compression stages to ISA SLS pressure rise across the centrifugal compression stage is from 0.75 to 1.

2. The gas turbine engine of claim 1, wherein the axi-centrifugal compressor comprises from 3 to 5 axial compression stages.

3. The gas turbine engine of claim 1, wherein the axi-centrifugal compressor comprises 4 axial compression stages.

4. The gas turbine engine of claim 1, further comprising a fixed-geometry inlet guide vane for the compressor.

5. The gas turbine engine of claim 1, wherein the engine has a core size, defined as an ISA SLS design point non-dimensional flow function in which mass flow W is measured at an entry to the compressor (station 2) and temperature T and pressure P are measured at an exit of the compressor (station 3) such that the core size is equal to $W_2\sqrt{T_3}/P_3$.

6. The gas turbine engine of claim 5, wherein the core size is from 0.5 to 1.5.

7. The gas turbine engine of claim 5, wherein the core size is from 0.7 to 0.9.

8. The gas turbine engine of claim 5, wherein the core size is from 1.0 to 1.5.

9. The gas turbine engine of claim 1, wherein the free power turbine is one of:
a single-stage turbine; and
a two-stage turbine.

10. The gas turbine engine of claim 1, wherein the gas-generator turbine and the free power turbine are arranged to contra-rotate.

* * * * *